(12) United States Patent
Morioka

(10) Patent No.: US 7,200,081 B2
(45) Date of Patent: Apr. 3, 2007

(54) WRITE STRATEGY CIRCUIT, WRITE STRATEGY METHOD, AND OPTICAL DISK APPARATUS

(75) Inventor: Makoto Morioka, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 568 days.

(21) Appl. No.: 10/808,079

(22) Filed: Mar. 24, 2004

(65) Prior Publication Data
US 2004/0190419 A1 Sep. 30, 2004

(30) Foreign Application Priority Data
Mar. 27, 2003 (JP) ............................. 2003-088661

(51) Int. Cl.
*G11B 7/00* (2006.01)
(52) U.S. Cl. ................. 369/47.28; 369/53.31; 369/59.1; 369/47.51
(58) Field of Classification Search ............... None
See application file for complete search history.

(56) References Cited
U.S. PATENT DOCUMENTS

| | | | | |
|---|---|---|---|---|
| 4,566,092 A | * | 1/1986 | Gerard et al. ............ | 369/59.19 |
| 5,875,163 A | * | 2/1999 | Kuroda et al. ........... | 369/47.48 |
| 6,101,158 A | * | 8/2000 | Hogan ........................ | 369/47.3 |
| 6,292,448 B1 | * | 9/2001 | Yoshida et al. ............ | 369/47.5 |
| 6,735,159 B2 | * | 5/2004 | Sugiyama ................. | 369/59.11 |
| 7,106,680 B2 | * | 9/2006 | Kato et al. ................ | 369/59.11 |
| 7,145,850 B2 | * | 12/2006 | Takumai et al. ......... | 369/47.28 |

* cited by examiner

*Primary Examiner*—Thang V. Tran
(74) *Attorney, Agent, or Firm*—Cooper & Dunham

(57) ABSTRACT

A write strategy circuit and a write strategy method for capturing data are disclosed. A strategy clock generator generates a strategy clock signal based on a channel clock signal. A phase controller produces a capturing channel clock signal by controlling a phase of the channel clock signal in synchronization with the strategy clock signal. A data capturing circuit captures the data in synchronization with the capturing channel clock signal. A phase determination circuit determines whether a length of the data corresponds to a predetermined value. A strategy correction circuit applies a predetermined strategy correction to the data based on the strategy clock signal. In this case, the phase controller controls the phase of the channel clock signal based on a determination result of the phase determination circuit. An optical disk apparatus using the write strategy circuit or the write strategy method is also disclosed.

20 Claims, 5 Drawing Sheets

WRITE STRATEGY CIRCUIT, WRITE STRATEGY METHOD, AND OPTICAL DISK APPARATUS

BACKGROUND

1. Field

This specification relates to a write strategy circuit, a write strategy method, and an optical disk apparatus using the write strategy circuit or the write strategy method. More particularly, this specification relates to a write strategy circuit, a write strategy method, and an optical disk apparatus for capturing data to be written to an optical disk.

2. Discussion of the Background

In a recorder for recording data on an optical disk having a pre-format such as CD-R/RW and DVD±RW/R, an LD (laser diode) driver irradiates a laser beam onto the optical disk according to serial data to be recorded, which has been generated by an optical disk encoder such as a CD or DVD encoder, and records the serial data on the optical disk. With the laser beam irradiation, a pit or mark having a length specified by the serial data based on a cycle unit of a predetermined channel clock signal is formed on a recording surface of the optical disk. Based on a difference in reflectivity between an irradiated portion where the pits or marks are formed and an un-irradiated portion on the recording surface of the optical disk, the recorded data can be read out from the optical disk.

The channel clock signal changes according to a recording speed of the optical disk. For example, the channel clock signal has a frequency of 4.32 MHz for a standard CD, and has a frequency of 26.16 MHz for a standard DVD. The marks or pits are formed on a spiral guide groove previously provided on the optical disk from the inner radius to the outer edge of the optical disk. Defining a unit cycle of the channel clock signal as T, the length of the mark is 3T to 11T in the case of CD, and 3T to 11T or 14T in the case of DVD.

The serial data generated by the optical disk encoder is an NRZ (Non-Return-to-Zero) signal, which changes based on the cycle unit of the channel clock signal. If a laser beam irradiates onto the optical disk according to the serial data, the pit or mark on the optical disk may be influenced by a thermal conduction, etc., such that the shape thereof may be skewed or may become nonuniform with the change in pit or mark length. In such a case, the data read out from the optical disk does not match with the data that has been recorded at the time of recording.

To prevent this, a correction is usually applied to the serial data, and a laser beam is irradiated according to the corrected signal. This correction is known as a write strategy. Applying an optimum write strategy according to a recording condition can improve a recording quality of an optical disk. Various standards of write strategy have been specified to record the optical disk of various types. Manufacturers of optical disk recorders or optical disk media, for example, develop products such as optical disk apparatuses in compliance with specific write strategy standards.

A write strategy correction is conventionally processed by the optical disk encoder. However, with higher recording speeds, a skew is caused between signals travelling along a long substrate wire provided between the optical disk encoder and the LD driver, thereby deteriorating a quality of data to be recorded. Therefore, it is more desirable to apply a write strategy in a vicinity of the LD driver for driving a semiconductor laser at the time of high-speed recording. In this case, the optical disk encoder supplies serial data and a channel clock signal to a write strategy circuit applying a write strategy correction. The write strategy circuit captures the serial data according to the received channel clock signal, measures the length of a series of pulses of the serial data, and applies a specific strategy correction to the serial data according to a waveform pattern of the pulses.

To achieve reliable data capturing, the phase of the channel clock signal and the phase of the serial data needs to be synchronized with each other. Generally, the phase of the channel clock signal and the phase of the serial data are slightly different due to an output delay difference of the optical disk encoder between the channel clock signal and the serial data, or a delay difference due to the difference in a substrate wire length between the channel clock signal and the serial data. Such a difference rarely affects the relationship between the phase of the channel clock signal and the phase of the serial data with slower optical disk recording speeds. However, with higher optical disk recording speeds, i.e., shorter channel clock signal cycles, this difference becomes more noticeable such that the edge of the channel clock signal and the edge of the serial data may not be optimally controlled, resulting in unreliable data capturing.

For example, FIG. 1 is a timing chart illustrating an operation of a background write strategy circuit. In FIG. 1, SD, CHCLK1, and SD1 correspond to input serial data input from the outside, a channel clock signal, and captured serial data captured by the write strategy circuit, respectively. As shown in FIG. 1, the rising edge of the channel clock signal CHCLK1 and the falling edge of the captured serial data SD1 coincide with each other. The captured serial data SD1 may have a data length ranging from 3 to 5 cycles of the channel clock signal CHCLK1, with respect to the input serial data SD having a data length of 4 cycles of the channel clock signal. Thus, the data to be read out may have a different length from the length of the data that has been recorded.

SUMMARY OF THE INVENTION

This patent specification describes a novel writing strategy circuit for capturing input data to be written on an optical disk. Particularly, this patent specification discloses a novel writing strategy circuit capable of optimally controlling a phase of a channel clock signal with respect to a phase of serial data.

In one example, a novel write strategy circuit includes a strategy clock generator, a phase controller, a data capturing circuit, a phase determination circuit, and a strategy correction circuit. The strategy clock generator generates a strategy clock signal by multiplying a frequency of a channel clock signal input from the outside. The phase controller produces a capturing channel clock signal by controlling a phase of the channel clock signal in synchronization with the strategy clock signal. The data capturing circuit captures input data in synchronization with the capturing channel clock signal. The phase determination circuit determines whether a length of the input data corresponds to a predetermined value. The strategy correction circuit applies a predetermined strategy correction to the input data based on the strategy clock signal. In this case, the phase controller changes the phase of the channel clock signal according to a determination result of the phase determination circuit.

The phase controller may generate a plurality of clock signals having different phases by sequentially shifting the phase of the channel clock signal based on a cycle of the strategy clock signal. In such a case, the phase controller selects one of the plurality of clock signals according to the determination result of the phase determination circuit.

Further, the strategy clock generator may include a PLL circuit and a frequency divider. The PLL circuit generates the strategy clock signal based on the channel clock signal. The frequency divider converts the strategy clock signal output from the PLL circuit to an output signal. In this case, the output signal of the frequency divider has a frequency substantially equal to the frequency of the channel clock signal.

Furthermore, the phase controller may produce the capturing channel clock signal by controlling a phase of the output signal according to the determination result.

Additionally, the novel strategy circuit may further include a memory for storing the determination result. In this case, the phase determination circuit stores the determination result in the memory, and the phase controller controls the phase of the channel clock signal according to the determination result stored in the memory.

This patent specification also describes a novel write strategy method. In one example, a novel write strategy method includes the steps of first generating, first producing, capturing, determining, and applying. The first generating step generates a strategy clock signal by multiplying a frequency of a channel clock signal. The first producing step produces a capturing channel clock signal by controlling a phase of the channel clock signal in synchronization with the strategy clock signal. The capturing step captures input data in synchronization with the capturing channel clock signal. The determining step-determines whether a length of the input data corresponds to a predetermined value. The applying step applies a predetermined strategy correction to the input data based on the strategy clock signal. In this case, the first controlling step controls the phase of the channel clock signal according to a determination result of the determining step.

The novel write strategy method may further include the steps of second generating and selecting. The second generating step generates a plurality of clock signals having different phases by sequentially shifting the phase of the channel clock signal based on a cycle period of the strategy clock signal. The selecting step selects one of the plurality of clock signals as the capturing channel clock signal according to the determination result.

The novel write strategy method may further include the steps of third generating and converting. The third generating step generates the strategy clock signal based on the channel clock signal. The converting step converts the strategy clock signal to an output signal. In this case, the output signal has a frequency substantially equal to the frequency of the channel clock signal.

The novel write strategy method may further include the step of second producing. The second controlling step produces the capturing channel clock signal by controlling a phase of the output signal according to the determination result.

The novel write strategy method may further include the step of storing the determination result. In this case, the first producing step controls the phase of the channel clock signal according to the determination result.

In addition to the novel write strategy circuit and the novel write strategy method, this specification may be implemented in other ways, including as an apparatus such as an optical disk apparatus or a system including a computer network or a communication line.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
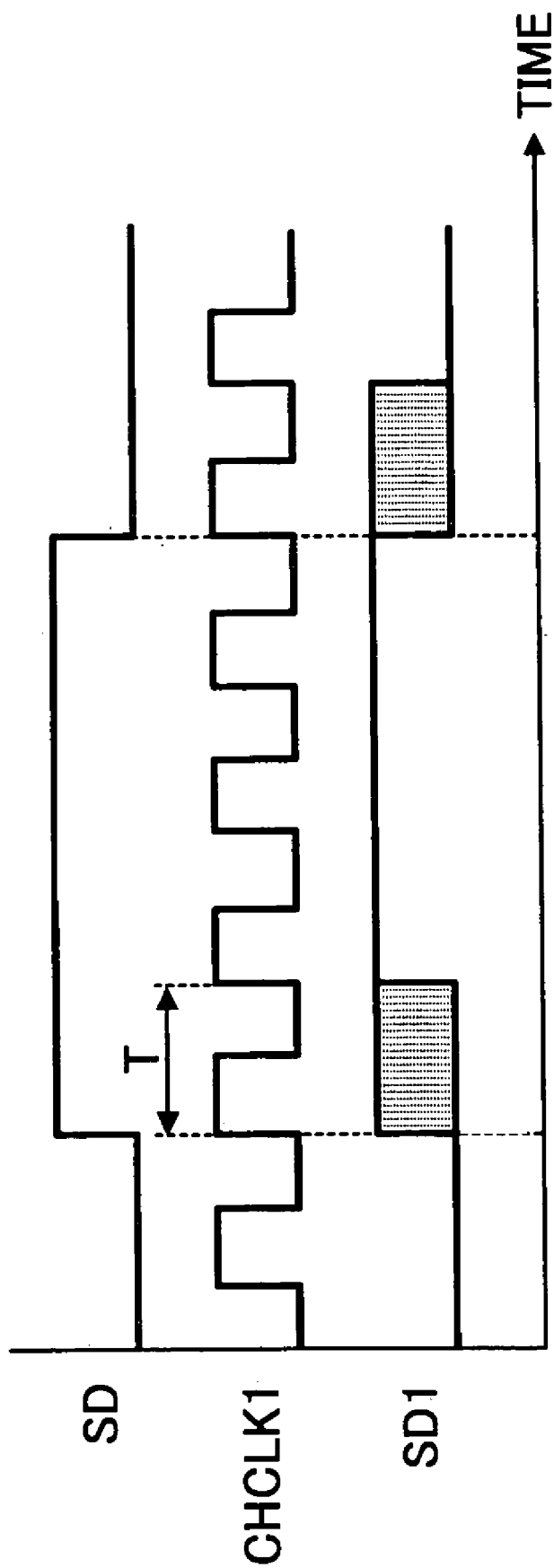
FIG. 1 is a timing chart demonstrating an operation of a background write strategy circuit.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, a description is made for an optical disk apparatus according to a preferred embodiment of the present invention.

Figure 2:
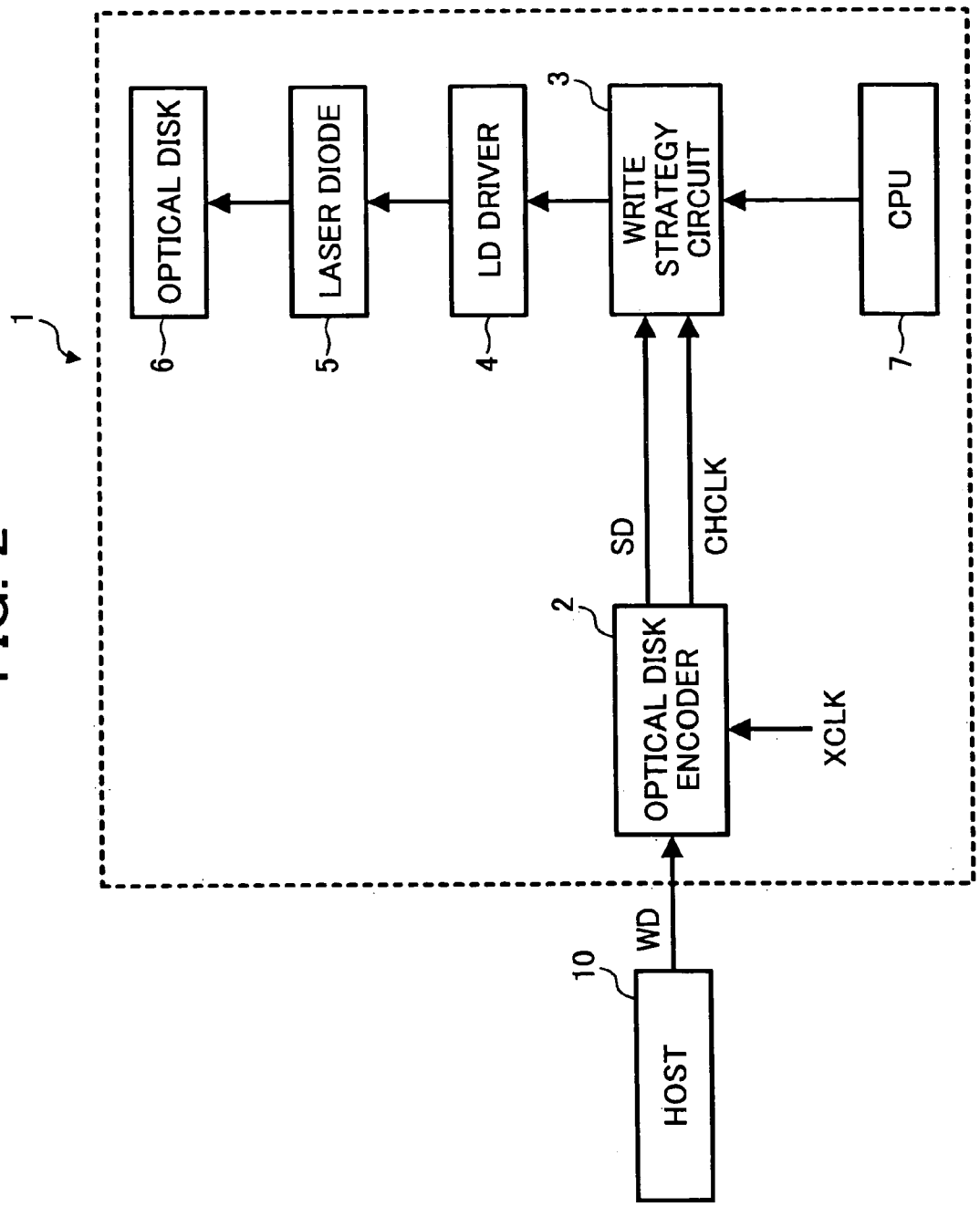
FIG. 2 is a block diagram illustrating an optical disk apparatus using a write strategy circuit according to an embodiment of the present invention.

The optical disk apparatus 1 of FIG. 2 includes an optical disk encoder 2, a write strategy circuit 3, an LD driver 4, a laser diode 5, an optical disk 6, a CPU (central processing unit) 7 and a host 10. In this specification, various types of compact discs (CD), digital versatile discs (DVD) or magneto-optical disks (MO) may be used as the optical disk 6. The host 10 corresponds to an apparatus, such as a personal computer, connected to the optical disk apparatus 1 either directly or indirectly such as through a communication line.

The optical disk encoder 2 receives data WD from the host 10 and a channel clock signal XCLK previously set based on a recording speed of the optical disk 6. The optical disk encoder 2 outputs serial data SD and a channel clock signal CHCLK to the write strategy circuit 3.

The write strategy circuit 3 applies a specific write strategy correction to the serial data SD according to the data pattern of the serial data SD in synchronization with the channel clock signal CHCLK. The write strategy circuit 3 outputs a control channel clock signal to the LD driver 4. The LD driver 4 drives the laser diode 5 by using this control channel clock signal, which controls a laser power of a laser beam emitted from the laser diode 5. Thus, the laser beam having an optimal laser power can be irradiated to the optical disk 6.

The CPU 7 sets up various parameters of the write strategy circuit 3 including a phase or a write strategy based on various factors such as a type of the optical disk 6 or environmental conditions including an outside temperature. This setting is performed either automatically, or manually via the host device 10.

Figure 3:
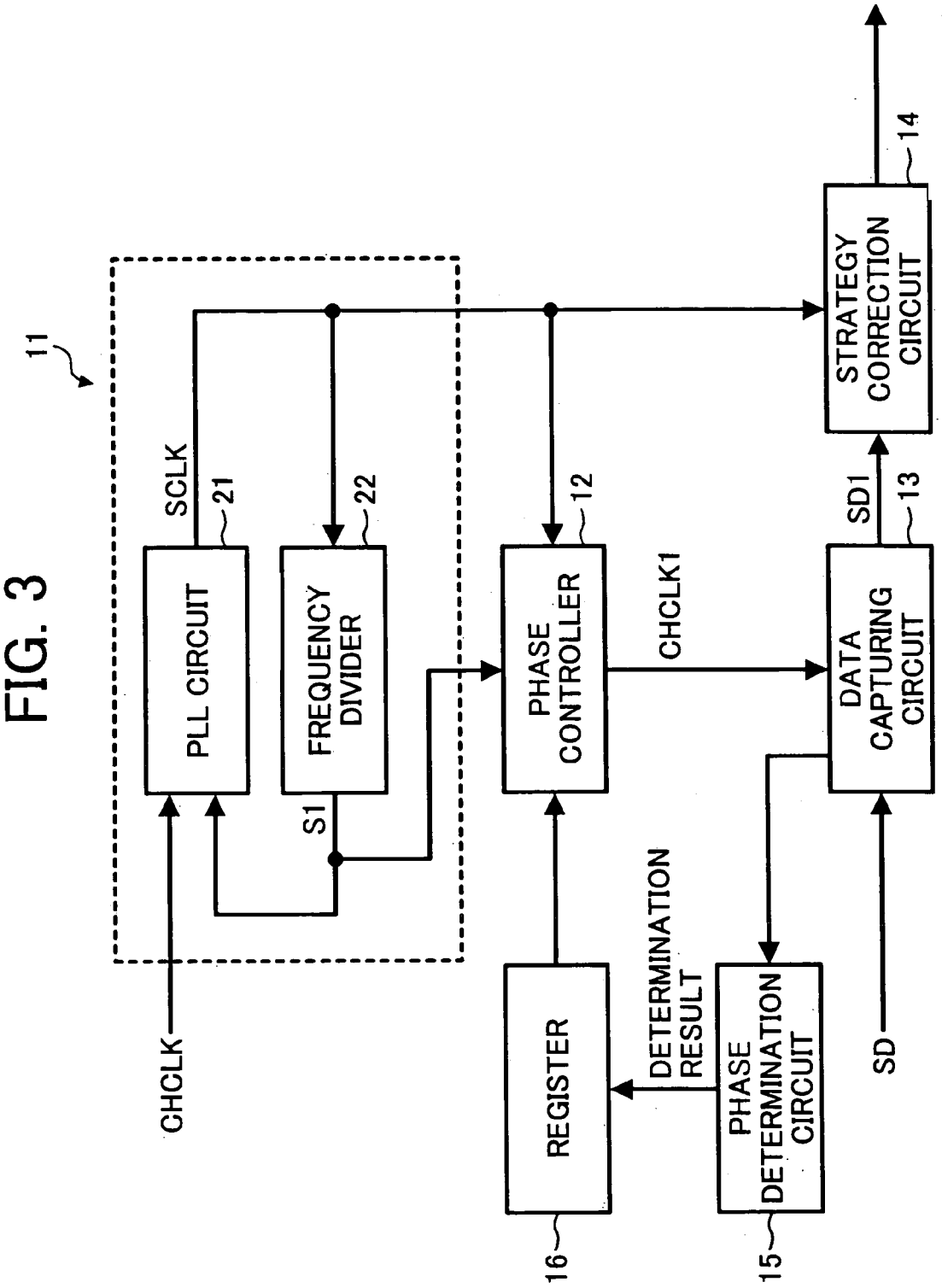
FIG. 3 is a block diagram illustrating an internal structure of a write strategy circuit of FIG. 2.

Referring to FIG. 3, an internal structure and an operation of the write strategy circuit 3 is explained. The write strategy circuit 3 includes a strategy clock generator 11, a phase controller 12, a data capturing circuit 13, a strategy correction circuit 14, a phase determination circuit 15, and a register 16.

The strategy clock generator 11 includes a PLL circuit 21 and a frequency divider 22. The PLL circuit 21 receives the channel clock signal CHCLK from the optical disk encoder 2, and generates a strategy clock signal SCLK by multiplying the frequency of the channel clock signal CHCLK by N (N denotes a division ratio, and is an integer greater than 0 in this example). The frequency divider 22 receives the strategy clock signal SCLK that has been output from the PLL circuit, and divides the frequency of the strategy clock signal SCLK by N to obtain an output signal S1. Thus, the output signal S1 has a frequency substantially equal to the frequency of the channel clock signal CHCLK. The output signal S1 is then fed back to the PLL circuit 21.

As described above, the PLL circuit 21 receives the channel clock signal CHCLK at one input terminal, and the output signal S1 at the other input terminal as a reference clock signal. In this case, however, instead of using the output signal S1, the PLL circuit 21 may use a clock signal obtained by dividing the channel clock signal CHCLK, as the reference clock signal.

The PLL circuit 21 outputs the strategy clock signal SCLK not only to the frequency divider 22, but also to the phase controller 12 and the strategy correction circuit 14, respectively. The frequency divider 22 outputs the output signal S1 not only to the PLL circuit 21, but also to the phase controller 12.

The phase controller 12 generates a plurality of clock signals each obtained by shifting the phase of the output signal S1 by a time specified based on a clock cycle of the strategy clock signal SCLK. Then, the phase controller 12 sequentially outputs the plurality of clock signals to the data capturing circuit 13 as a capturing channel clock signal CHCLK1.

The data capturing circuit 13 acquires the serial data SD from the optical disk apparatus 2 in synchronization with the capturing channel clock signal CHCLK1, and outputs captured serial data SD1.

The phase determination circuit 15 determines whether the captured serial data SD1 has a data length corresponding to a predetermined data length that has been previously set based on the recording speed of the optical disk 6. The phase determination circuit 15 then writes a determination result to the register 16 which serves as a memory. For example, when the predetermined data length is set to 4T with T indicating one cycle of the channel clock signal CHCLK, the phase determination circuit 15 determines whether the captured serial data SD1 has a data length substantially equal to 4T, and writes "1" in the register 16 if the data is substantially equal to 4T, and "0" if the data length is not 4T.

In this case, the register 16 may be provided with an error flag bit. When the phase determination circuit 15 detects the error flag in the register 16, the phase determination circuit 15 writes "1" in the register 16. On the other hand, when no error flag is detected, the phase determination circuit 15 writes "0" in the register 16.

Based on the determination result stored in the register 16, the phase controller 12 selects one signal having the determination result "1" from the plurality of clock signals. The phase controller 12 then continuously sends the selected signal to the data capturing circuit 13 as the capturing channel clock signal CHCLK1.

The data capturing circuit 13 that has received the capturing channel clock signal CHCLK1 together with the serial data SD outputs the captured serial data SD1 to the strategy correction circuit 14.

The strategy correction circuit 14 applies a predetermined strategy correction to the captured serial data SD1 in synchronization with the strategy clock signal SCLK that has been received from the PLL circuit 21, and outputs resultant serial data to the LD driver 4 for further processing.

Figure 4:
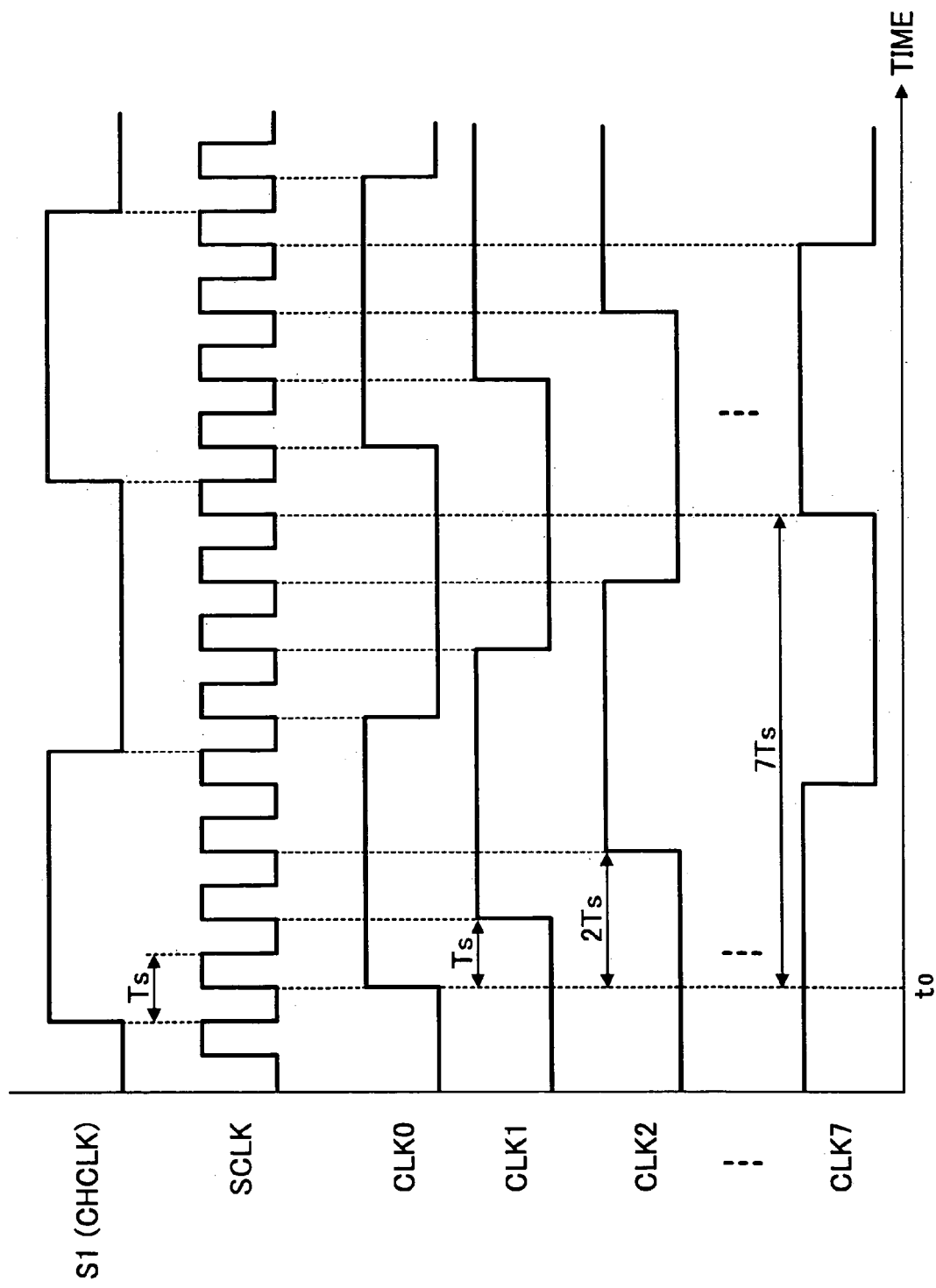
FIG. 4 is a timing chart demonstrating an operation of a phase controller of FIG. 3.

Referring to FIG. 4, a process of generating a plurality of clock signals by using the phase controller 12 is explained. In FIG. 4, cycle unit Ts denotes one clock cycle of the strategy clock signal SCLK. Time to denotes a time when the strategy clock signal SCLK first rises after the rise of the serial data S1. In this example, the waveform of the channel clock signal CHCLK and the waveform of the serial data S1 are substantially the same, such that they are shown as one waveform in FIG. 4. The following explanation mainly uses the output signal S1 as a reference signal for the purpose of simplicity, however, the channel clock signal CHCLK may be used as the reference signal.

As shown in FIG. 4, the strategy clock signal SCLK can be obtained by dividing the frequency of the channel clock signal CHCLK by eight (N=8). The phase controller 12 generates a clock signal CLK0, which has a same cycle period with the cycle period of the output signal S1 and rises at t0. The phase controller 12 further generates a clock signal CLK1 by shifting the phase of the clock signal CLK0 by the cycle unit Ts away from t0. Subsequently, the phase controller 12 generates a clock signal CLK2, a clock signal CLK3, a clock signal CLK4, a clock signal CLK5, a clock signal CLK6, and a clock signal CLK7, by shifting the phase of the clock signal CLK0 by 2Ts, 3Ts, 4Ts, 5Ts, 6Ts, and 7Ts away from t0, respectively. Thus, the plurality of clock signals CLK0 to CLK7 having different phases with respect to the phase of the output signal S1 can be generated.

The phase controller 12 shifts the phase of the output signal S1 by using a shift register, not shown. The shift register provided in the phase controller 12 is a conventional shift register for serially shifting input data in synchronization with an input clock signal. Particularly in this example, the shift register shifts the output signal S1 in synchronization with the strategy clock signal SCLK with the division ratio N=8. Thus, the amount of shift or delay depends on the division ratio N.

For example, when the division ratio N is 2, the phase controller 12 generates a plurality of signals CLK0 to CLK1 by shifting the phase of the output signal S1 based on a half cycle period of the strategy clock signal SCLK. Similarly, when the division ratio N is 4, the phase controller 12 generates a plurality of signals CLK0 to CLK3 by shifting the phase of the output signal S1 based on a quarter cycle period of the strategy clock signal SCLK.

Next, a process of selecting one of a plurality of clock signals as a capturing channel clock signal based on a determination result is explained.

The phase controller 12 is previously set so as to first output the clock signal CLK0 to the data capturing circuit 13 as the capturing channel clock signal CHCLK1. The phase determination circuit 15 determines whether the captured serial data SD1 output from the data capturing circuit 13 corresponds to the predetermined data length, and writes the determination result in the register 16. The phase controller 12 reads out the determination result stored in the register 16. When the determination result indicates that the data length of the captured serial data SD1 corresponds to the predetermined data length, the phase controller 12 stops the selection process and continuously outputs the clock signal CLK0 as the capturing channel clock signal CHCLK1.

On the contrary, when the determination result indicates that the data length of the captured serial data SD1 does not correspond to the predetermined data length, the phase controller 12 outputs the clock signal CLK1 as the capturing channel clock signal CHCLK1 to the data capturing circuit 13 to repeat a process similar to the above-described process.

Figure 5:
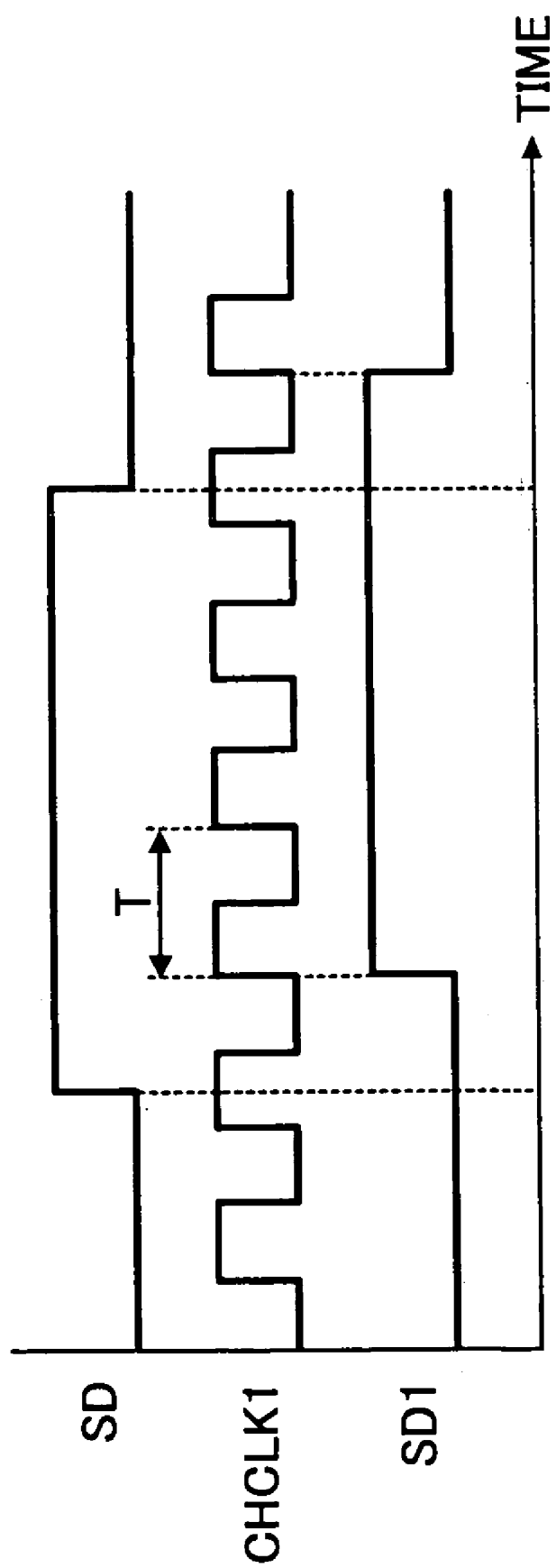
FIG. 5 is a timing chart demonstrating an operation of a write strategy circuit according to an embodiment of the present invention.

The phase controller 12 sequentially checks the plurality of clock signals CLK0 to CLK7 until it is determined that the data length of the captured serial data SD1 corresponds to the predetermined data length. When it is determined that the data length of the captured serial data SD1 corresponds to the predetermined data length, the phase controller 12 stops the selection process and continuously outputs the selected clock signal as the capturing channel clock signal CHCLK1 to the data capturing circuit 13. Thus, as shown in FIG. 5, the phase of the channel clock signal CHCLK1 can be optimally controlled with respect to the phase of the serial data SD.

In the above-described selection process, the phase controller 12 stops providing any of the plurality of clock signals after obtaining the captured serial data SD1 having a data length corresponding to the predetermined data length. However, the phase determination circuit 15 may determine whether the captured serial data SD1 has a data length corresponding to a predetermined data length for each of the clock signals CLK0 to CLK7, stores the determination results for the plurality of clock signals CLK0 to CLK7 in the register 16, and then selects a signal that has a data length closer to the predetermined data length.

Further, the above-described selection process can be performed automatically as described above, or manually via the host 10. To manually control the phase of the output signal S1, the register 16 may be provided with an output terminal, which outputs the determination result as an output signal to the host 10. In such a case, the phase can be controlled via the host 10 by specifying a type of data to be stored in the shift register based on the division ratio N. For example, the shift register may be supplied with 1-bit data when N=2, 2-bit data when N=4, and 3-bit data when N=8.

Numerous additional modifications and variations are possible in light of the above teachings. It is therefore to be understood that within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims.

This patent specification is based on Japanese patent applications, No. JPAP2003-088661 filed on Mar. 27, 2003, in the Japanese Patent Office, the entire contents of which are incorporated by reference herein.

What is claimed is:

1. A write strategy circuit for capturing input data to be written on an optical disk, comprising:
   a strategy clock generator configured to generate a strategy clock signal by multiplying a frequency of a channel clock signal;
   a phase controller configured to produce a capturing channel clock signal by controlling a phase of the channel clock signal in synchronization with the strategy clock signal;
   a data capturing circuit configured to capture the input data in synchronization with the capturing channel clock signal;
   a phase determination circuit configured to determine whether a length of the input data corresponds to a predetermined value; and
   a strategy correction circuit configured to apply a predetermined strategy correction to the input data based on the strategy clock signal,
   wherein the phase controller controls the phase of the channel clock signal according to a determination result of the phase determination circuit.

2. A write strategy circuit as claimed in claim 1, wherein the phase controller generates a plurality of clock signals having different phases by sequentially shifting the phase of the channel clock signal based on a cycle of the strategy clock signal, and selects one of the plurality of clock signals as the capturing channel clock signal according to the determination result.

3. A write strategy circuit as claimed in claim 1, further comprising:
   a PLL circuit configured to generate the strategy clock signal based on the channel clock signal; and
   a frequency divider configured to convert the strategy clock signal to an output signal having a frequency substantially equal to the frequency of the channel clock signal.

4. A write strategy circuit as claimed in claim 3, wherein the phase controller produces the capturing channel clock signal by controlling a phase of the output signal according to the determination result.

5. A write strategy circuit as claimed in claim 1, further comprising a memory for storing the determination result,
   wherein the phase determination circuit stores the determination result in the memory, and the phase controller controls the phase of the channel clock signal according to the determination result stored in the memory.

6. A write strategy method for capturing input data to be written on an optical disk, comprising the steps of:
   first generating a strategy clock signal by multiplying a frequency of a channel clock signal;
   first producing a capturing channel clock signal by controlling a phase of the channel clock signal in synchronization with the strategy clock signal;
   capturing the input data in synchronization with the capturing channel clock signal;
   determining whether a length of the input data corresponds to a predetermined value; and
   applying a predetermined strategy correction to the input data based on the strategy clock signal,
   wherein the first producing step controls the phase of the channel clock signal according to a determination result of the determining step.

7. A write strategy method as claimed in claim 6, further comprising the steps of:
   second generating a plurality of clock signals having different phases by sequentially shifting the phase of the channel clock signal based on a cycle period of the strategy clock signal; and
   selecting one of the plurality of clock signals as the capturing channel clock signal according to the determination result.

8. A write strategy method as claimed in claim 6, further comprising the steps of:
   third generating the strategy clock signal based on the channel clock signal; and converting the strategy clock signal to an output signal having a frequency substantially equal to the frequency of the channel clock signal.

9. A write strategy method as claimed in claim 8, further comprising the step of:
second producing the capturing channel clock signal by controlling a phase of the output signal according to the determination result.

10. A write strategy method as claimed in claim 6, further comprising the step of storing the determination result,
wherein the first producing step controls the phase of the channel clock signal according to the determination result.

11. A write strategy circuit for capturing input data to be written on an optical disk, comprising:
first generating means for generating a strategy clock signal by multiplying a frequency of a channel clock signal;
first producing means for producing a capturing channel clock signal by controlling a phase of the channel clock signal in synchronization with the strategy clock signal;
means for capturing the input data in synchronization with the capturing channel clock signal;
determining means for determining whether a length of the input data corresponds to a predetermined value; and
means for applying a predetermine strategy correction to the input data based on the strategy clock signal,
wherein the first producing means controls the phase of the channel clock signal according to a determination result of the determining means.

12. A write strategy circuit as claimed in claim 11, further comprising:
second generating means for generating a plurality of clock signals having different phases by sequentially shifting the phase of the channel clock signal based on a cycle of the strategy clock signal; and
selecting means for selecting one of the plurality of clock signals as the capturing channel clock signal according to the determination result.

13. A write strategy circuit as claimed in claim 11, further comprising:
third generating means for generating the strategy clock signal based on the channel clock signal; and
means for converting the strategy clock signal to an output signal having a frequency substantially equal to the frequency of the channel clock signal.

14. A write strategy circuit as claimed in claim 13, further comprising:
second producing means for producing the capturing channel clock signal by controlling a phase of the output signal according to the determination result.

15. A write strategy circuit as claimed in claim 11, further comprising means for storing the determination result,
wherein the first producing means controls the phase of the channel clock signal according to the determination result.

16. An optical disk apparatus for capturing input data to be written on an optical disk, comprising a write strategy circuit including:
a strategy clock generator configured to generate a strategy clock signal by multiplying a frequency of a channel clock signal;
a phase controller configured to produce a capturing channel clock signal by controlling a phase of the channel clock signal in synchronization with the strategy clock signal;
a data capturing circuit configured to capture the input data in synchronization with the capturing channel clock signal;
a phase determination circuit configured to determine whether a length of the input data corresponds to a predetermined value; and
a strategy correction circuit configured to apply a predetermined strategy correction to the input data based on the strategy clock signal,
wherein the phase controller controls the phase of the channel clock signal according to a determination result of the phase determination circuit.

17. An optical disk apparatus as claimed in claim 16, wherein the phase controller generates a plurality of clock signals having different phases by sequentially shifting the phase of the channel clock signal based on a cycle of the strategy clock signal, and selects one of the plurality of clock signals as the capturing channel clock signal according to the determination result.

18. An optical disk apparatus as claimed in claim 16, wherein the write strategy circuit further comprises:
a PLL circuit configured to generate the strategy clock signal based on the channel clock signal; and
a frequency divider configured to convert the strategy clock signal to an output signal having a frequency substantially equal to the frequency of the channel clock signal.

19. An optical disk apparatus as claimed in claim 18,
wherein the phase controller produces the capturing channel clock signal by controlling a phase of the output signal according to the determination result.

20. An optical disk apparatus as claimed in claim 16, wherein the write strategy circuit further comprises a memory for storing the determination result, and
wherein the phase determination circuit stores the determination result in the memory, and the phase controller controls the phase of the channel clock signal according to the determination result stored in the memory.

* * * * *